April 11, 1961
J. E. THOMAS
2,979,341
FIFTH WHEEL ASSEMBLY
Filed Sept. 25, 1958
2 Sheets-Sheet 1
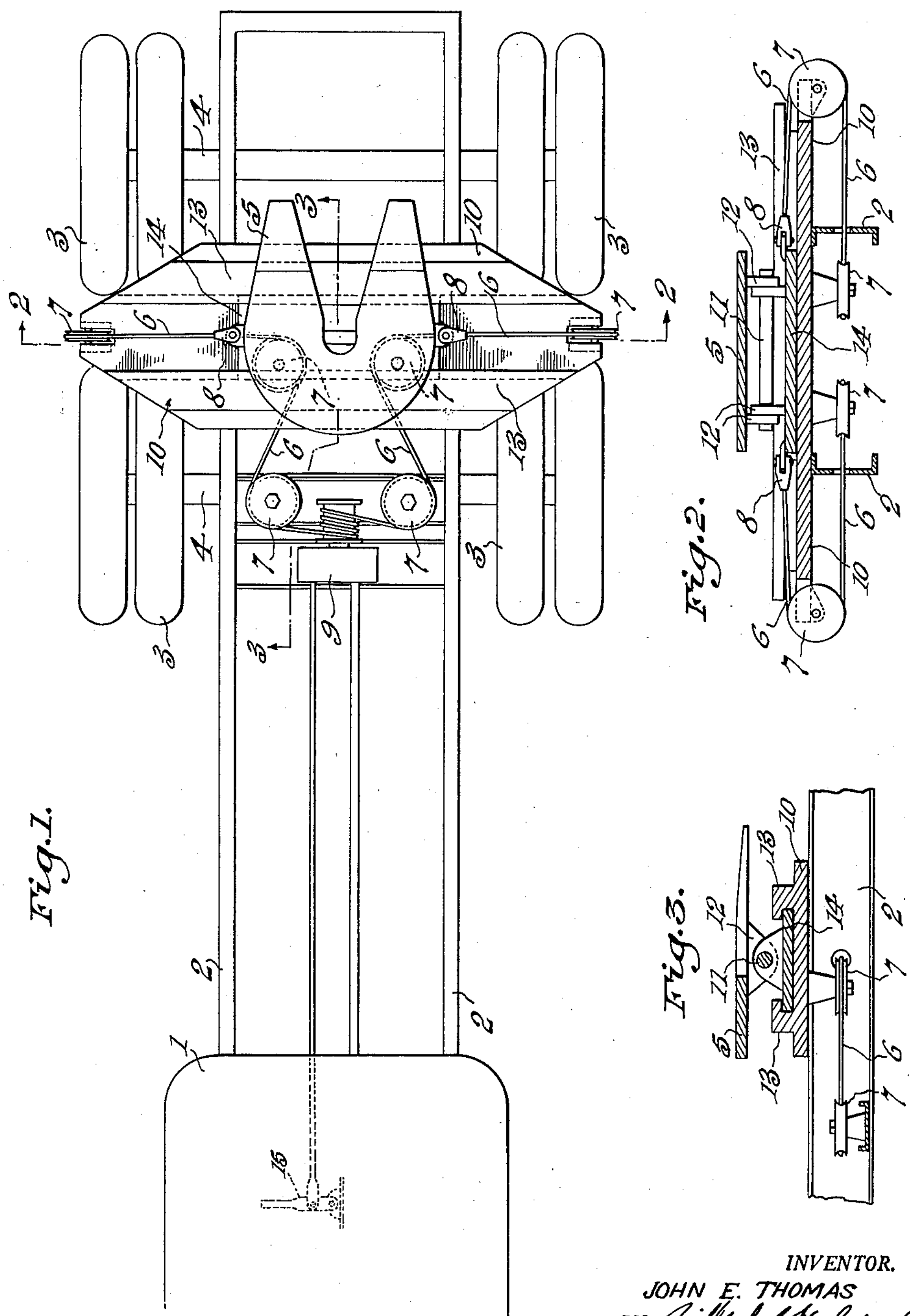
INVENTOR.
JOHN E. THOMAS
BY Willard J. Hodges, Jr.
Boniface J. Hamilton
ATTORNEYS FIFTH WHEEL ASSEMBLY
Filed Sept. 25, 1958 2 Sheets-Sheet 2
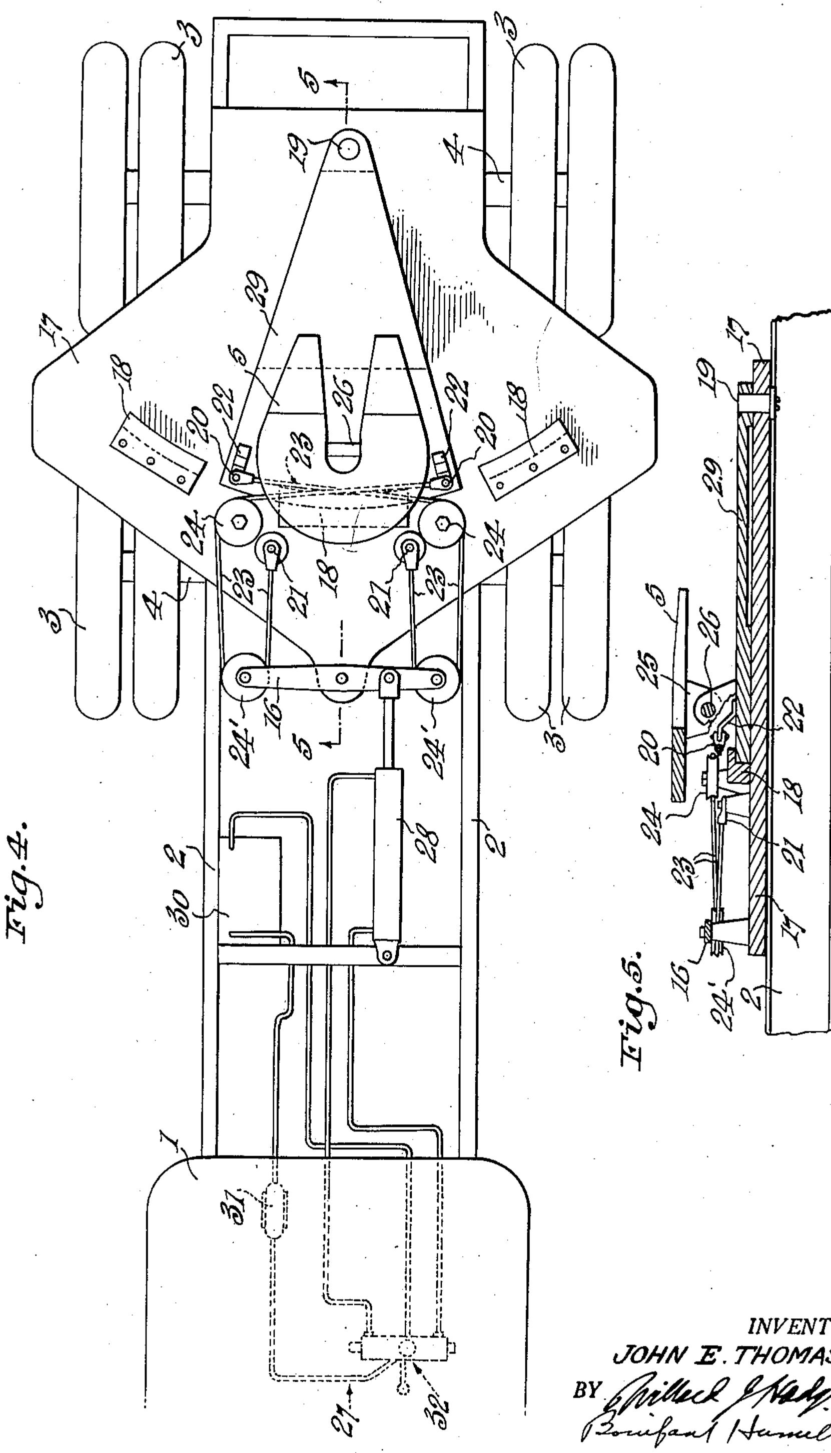
INVENTOR.
JOHN E. THOMAS
BY [signature]
ATTORNEYS United States Patent Office 2,979,341

Patented Apr. 11, 1961

1

2,979,341

FIFTH WHEEL ASSEMBLY

John E. Thomas, Rte. 1, Box 34-2, Tabb, Va.

Filed Sept. 25, 1958, Ser. No. 763,422

5 Claims. (Cl. 280—423)

(Granted under Title 35, U.S. Code (1952), sec. 266)

The invention described herein may be manufactured and used by or for the Government for governmental purposes without the payment of any royalty thereon.

This invention relates to couplings for a truck tractor and semitrailer combination whereby means of a modified assembly the fifth wheel can be moved transversely of the tractor chassis by power-operated means under the control of the driver.

Coupling devices, which permit the distance between the truck and semitrailer to be varied and thereby provide increased clearance, allow different trailers to be used and adjust the distribution of the load longitudinally of the combined vehicle are known in the art. Tractor-semitrailer couplings in which the point of application of the trailer weight to the tractor is moved laterally as the tractor-trailer travels along a curved path, thereby to oppose centrifugal forces, is also known in the prior art. It is not known, however, to shift the fifth wheel transversely of the tractor under driver control to facilitate maneuvering the combined vehicle.

It is a general object of the invention to provide efficient means of shifting the fifth wheel couling for a tractor and semitrailer combination for ease in maneuvering the vehicle, particularly for backing operations.

A further object of this invention is to provide driver-operated control means accessible from the interior of the tractor cab to shift the fifth wheel transversely of the tractor.

It is yet another object to provide means to adjust the application of the load of the front end of the trailer transversely of the tractor to provide improved load balance and better tracking of the tractor by the trailer during side slope operations.

These and further objects of the invention will be set forth in the following specification, reference being had to the accompanying drawings and the novel means by which said objects are effectuated will be definitely pointed out in the claims.

In the drawings:

Fig. 1 is a top plan view of the fifth wheel arrangement.

Fig. 2 is a transverse cross sectional view taken on line 2—2 of Fig. 1.

Fig. 3 is a longitudinal cross sectional view taken on line 3—3 of Fig. 1.

Fig. 4 is a top plan view of a modified form of the invention.

Fig. 5 is a longitudinal cross sectional view taken on line 5—5 of Fig. 4.

Referring now more particularly to Figs. 1, 2, and 3, there is shown a standard tractor having a cab 1 and chassis frame 2 with wheels 3 and axles 4. The wheels 4 are all double wheels and are arranged to provide a four wheel bogie under the rear portion of the tractor frame. The frame 2 is designed to carry the usual fifth wheel structure and thus receive the load of the front end of the semi-trailer at a location between the front and rear axles of the bogie and forwardly of the rear end of the frame. This arrangement is standard practice in tractor-semi-trailer vehicles. A base 10 is disposed transversely of the frame 2 and rigidly secured thereon. The base 10 is provided with longitudinally extending inwardly directed flanges 13 providing an inverted T slot extending longitudinally of the base and transversely of the tractor frame and a block 14 is slidable in the slot. The fifth wheel 5 is rockably mounted on the slide block 14 by means of hinges 12, and hinge pin 11 and is disposed substantially midway between the axles of the four wheel bogie.

A conventional reversible winch 9 powered from the transmission power take-off has cable 6 wound around it, the cable extending therefrom on either side to a system of pulleys 7, two pairs having the sheaves horizontally disposed on either side of the longitudinal center line of the chassis frame 2, and a third pair having the sheaves disposed vertically in slots at the ends of base 10. The cable 6 then runs along the top of base 10 towards the center where it fastens at either end to slide block 14 by means of clevises 8. A mechanical winch control exemplified by lever 15 in cab 1 permits the operator to stop, start and reverse the winch 9.

Figs. 4 and 5 show a modification of the invention wherein a diamond-shaped flat base plate 17 is disposed horizontally on the tractor frame 2 and is rigidly secured thereon with its longitudinal center line substantially coincident with the longitudinal center line of the tractor frame. This base plate extends across the entire width of frame 2, and laterally beyond the sides of the frame and extends longitudinally beyond the bogie axles at both ends. The cab 1, axles 3, wheels 4, and fifth wheel 5 are similar to the structure as in Fig. 1. A flat carrier plate 29 is slidably disposed on the base plate 17 and is pivotally mounted at one end on the rear end of the base plate 17 by pivot pin 19, the axis of which is substantially perpendicular to the longitudinal center lines of the flat base, member 17 and the carrier plate 29. The pivotal connection provided by pin 19 limits the movements of plate 29 relative to base member 17 to swinging movements about the axis of the pivotal connection and the front end of plate 29 is curved along an arc centered on the axis of the pivotal connection. Lipped guide blocks or flanges 18 are mounted on base plate 17 and engage the arcuate edge of the front end of the carrier plate 29 to hold it flat on the base plate. The carrier plate is provided with bracket elements 22 which have cable connectors 20 attaching them to cable 23. Cable 23 travels through two sets of pulleys 24 and 24¹ and connects to cable anchors 21. The pulleys 24' are mounted on the respectively opposite ends of a rock bar 16 which is rockably mounted at its mid-length location on the front end of base member 17 and extends transversely of the vehicle frame. One end of the rock bar is connected to a piston, not shown, slidable in a cylinder 28 mounted on the vehicle frame. The piston and cylinder constitute a hydraulic device operated by a hydraulic system including a fluid reservoir 30, a pump 31 and a control valve and valve operating lever 32. The valve lever is mounted in the tractor cab in convenient reach of the operator.

The fifth wheel 5 is mounted on the carrier plate 29 at a location along the carrier plate which positions the fifth wheel substantially midway between the axles of the four wheel tractor bogie, as shown in Fig. 4. The length of the carrier plate from the pivot pin 19 to the curved front end of the plate is such, in proportion to width of the base member 17 that the angle of maximum movement of the carrier plate to opposite sides of its neutral position is so limited that there is no dead center effect and no undue strain is placed on the cable 23 in moving the front end of the carrier plate from one to the other of its limiting positions. The distance from the pivot pin 19 to the fifth wheel 5 is such that the fifth wheel is moved across the major portion of the width of the tractor frame when the carrier plate is moved from one limiting position to the other through the limited angle of movement as described above.

As is also shown in Fig. 4, the carrier plate 29 has an area that is approximately one third of the area of the base member 17. This area has been found sufficient to distribute the load of the front end of the trailer to an extent such that the unit pressure of the plate 29 on the base plate 17 is below the value at which the friction reducing effect of ordinary lubricating grease between the two plates is materially affected. It will also be noted that the lateral extensions of the base plate are of such dimensions that the entire area of carrier plate 29 is always within the boundaries of base member 17.

In operation the driver while backing up the vehicle can through manual controls operate the power-actuated means which will operate the winch 9 in the one modification shown in Figs. 1, 2 and 3 or the transverse bar 16 of the other modification shown in Figs. 4 and 5. Through the system of the pulleys the fifth wheel 5 will be moved in either direction transversely of the chassis thus assisting the driver to steer the semitrailer.

It can be seen that manually controllable, power-actuated means other than the winch and hydraulic system may be used, if desired.

From the foregoing description, it is obvious that a semitrailer fifth wheel construction in accordance with my invention is particularly well adapted for use by reason of its simplicity of construction and facility of operation. It will also be obvious that my invention is susceptible of some change and modification without departing from the principles herein disclosed.

I claim:

1. A coupling for a tractor trailer having a chassis comprising a base member transversely secured to the tractor trailer chassis, a plurality of flange means arcuately disposed on said base member transversely of said chassis, a plate rotatably disposed upon said base member and adapted to ride under said plurality of flange means, a fifth wheel rockably mounted upon said plate, spaced connector means secured in fixed position on said plate and aligned transversely of the longitudinal center line of the chassis, a first set of spaced pulleys adjacent said plate and aligned transversely of the longitudinal axis of the chassis, said first set of pulleys mounted on vertically disposed shafts carried by said base member, a centrally pivoted lever carried by said base member and normally aligned transversely of the longitudinal axis of the chassis, said lever spaced from said first set of pulleys along the longitudinal axis of the chassis, a second set of spaced pulleys mounted on vertically disposed shafts carried adjacent the ends of said lever, said second set of pulleys vertically aligned with said first set of pulleys, a pair of transversely aligned anchors secured to said base member intermediate said first and second sets of pulleys, a pair of cables, each one of said pair of cables connected at one end thereof to one of said spaced connector means and at the other end thereof to one of said anchors and intermediately engaging the sheaves of one of said first pair of pulleys and one of said second pair of pulleys in alignment with the longitudinal axis of the chassis, each one of said pairs of cables configured by the arrangement of said spaced connectors, anchors and first and second sets of pulleys to extend transversely and longitudinally relative to the chassis, remotely controlled fluid actuated reversible drive means eccentrically connected to said lever whereby upon operation of said reversible drive means said lever is moved to selectively operate one of said pair of cables to shift the fifth wheel transversely of the tractor trailer chassis.

2. A coupling for connecting a semi-trailer to a tractor truck having a wheel supported frame comprising a flat base member overlying the rearward portion of said frame and secured thereto, a flat carrier plate disposed on said base member for lateral sliding movements relative to the base member, and having a neutral position in which the longitudinal center line of said carrier plate is substantially in vertical alignment with the longitudinal center lines of said base member and said frame, means pivotally connecting the rear end of said carrier plate to the rear portion of said base member for swinging movements of said carrier plate about an axis substantially perpendicular to the longitudinal center line of said carrier plate, means carried by said base member and slidably engageable with the front portion of said carrier plate to maintain said carrier plate adjacent and substantially parallel to said base member, a fifth wheel structure mounted on the front portion of said carrier plate for rocking movements about an axis substantially at right angles to the longitudinal center line of said carrier plate, power operated means carried by said base member and connected to said carrier plate for swinging said carrier plate in either direction away from its neutral position and returning said carrier plate to its neutral position, and manually actuated control means connected to said power operated means and effective to enable the operator of a tractor trailer combination to selectively move said fifth wheel structure transversely of the rear portion of the tractor truck frame.

3. A coupling for connecting a semi-trailer to a tractor truck having a wheel supported frame comprising a flat base member mounted on the rearward portion of said frame and extending across the width of said frame, a flat carrier plate disposed on said base member for lateral sliding movement on the base member, a pivotal connection pivotally connecting the rear end of said carrier plate to the rear portion of said base member to limit the movement of said carrier plate relative to said base member to a swinging movement, a fifth wheel structure mounted on said carrier plate forwardly of said pivotal connection a distance to locate said fifth wheel structure over the portion of said frame designed to receive the load of the front end of a semi-trailer, said carrier plate having a neutral position relative to said base member and said frame in which the longitudinal center lines of said frame, said base member and said carrier plate are substantially in vertical alignment, and manually controlled power operated means connected between said base member and said carrier plate for moving said carrier plate away from and back to said neutral position.

4. A coupling for connecting a semi-trailer to a tractor truck having a wheel supported frame comprising a flat base member mounted on the rearward portion of said frame and extending across the width of said frame, a flat carrier plate disposed on said base member for lateral sliding movement on the base member, a pivotal connection pivotally connecting the rear end of said carrier plate to the rear portion of said base member to limit the movement of said carrier plate relative to said base member to a swinging movement, a fifth wheel structure mounted on said carrier plate forwardly of said pivotal connection a distance to locate said fifth wheel structure over the portion of said frame designed to receive the load of the front end of a semi-trailer, said carrier plate having a neutral position relative to said base member and said frame in which the longitudinal center lines of said frame, said base member and said carrier plate are substantially in vertical alignment, and manually controlled power operated means connected between said base member and said carrier plate for moving said carrier plate away from and back to said neutral position, said carrier plate having a length and said power operated means having a stroke such that the front end of said carrier plate is moved within angular limits that impose no excessive loads on said power operated means.

5. A coupling for connecting a semi-trailer to a tractor truck having a wheel supported frame comprising a flat base member mounted on the rearward portion of said frame and extending across the width of said frame, a flat carrier plate disposed on said base member for lateral sliding movement on the base member, a pivotal connection pivotally connecting the rear end of said carrier plate to the rear portion of said base member to limit the movement of said carrier plate relative to said base member to a swinging movement, a fifth wheel structure mounted on said carrier plate forwardly of said pivotal connection a distance to locate said fifth wheel structure over the portion of said frame designed to receive the load of the front end of a semi-trailer, said carrier plate having a neutral position relative to said base member and said frame in which the longitudinal center lines of said frame, said base member and said carrier plate are substantially in vertical alignment, and manually controlled power operated means connected between said base member and said carrier plate for moving said carrier plate away from and back to said neutral position, said carrier plate being completely within the area of said base member at all times and having an area such that the unit bearing pressure between said carrier plate and said base member is at no time sufficient to materially reduce the friction reducing effect of ordinary lubricant between said carrier plate and said base member.

References Cited in the file of this patent

UNITED STATES PATENTS

| | | |
|---|---|---|
| 2,557,471 | Romig et al. | June 19, 1951 |
| 2,681,236 | Apgar | June 15, 1954 |
| 2,745,680 | Achenbach | May 15, 1956 |